(12) United States Patent
Tsui

(10) Patent No.: US 6,914,638 B2
(45) Date of Patent: Jul. 5, 2005

(54) THREE-DIMENSIONAL ENHANCEMENT PROCESSING FOR TELEVISION BROADCASTING SIGNALS

(75) Inventor: Ernest T. Tsui, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 09/745,248

(22) Filed: Dec. 20, 2000

(65) Prior Publication Data

US 2002/0113893 A1 Aug. 22, 2002

(51) Int. Cl.[7] .............................. H04N 3/27; H04N 9/77
(52) U.S. Cl. ...................... 348/663; 348/665; 348/667; 348/670; 382/261
(58) Field of Search ................................ 348/663–670, 348/554–555, 659–661, 558; 345/600, 603–605; 382/261, 162; H04N 3/27, 9/77

(56) References Cited

U.S. PATENT DOCUMENTS

| | | | | |
|---|---|---|---|---|
| 5,097,321 A | * | 3/1992 | Stern et al. ................. 348/450 |
| 5,220,414 A | * | 6/1993 | Rabii et al. ................. 348/665 |
| 5,231,478 A | * | 7/1993 | Fairhurst .................... 348/663 |
| 5,249,040 A | * | 9/1993 | Sugiyama ................... 348/663 |
| 5,373,328 A | * | 12/1994 | Hong ......................... 348/668 |
| 5,386,244 A | * | 1/1995 | Gai ............................. 348/610 |
| 5,416,532 A | * | 5/1995 | Ko ............................. 348/665 |
| 5,473,389 A | * | 12/1995 | Eto et al. .................... 348/669 |
| 5,541,669 A | * | 7/1996 | Yamaguchi et al. ........ 348/669 |
| 5,583,579 A | * | 12/1996 | Shim .......................... 348/668 |
| 5,790,096 A | * | 8/1998 | Hill, Jr. ...................... 345/600 |
| 5,805,238 A | * | 9/1998 | Raby et al. ................. 348/609 |
| 5,808,701 A | * | 9/1998 | Lee ............................ 348/712 |
| 5,990,978 A | * | 11/1999 | Kim et al. .................. 348/663 |
| 6,055,024 A | * | 4/2000 | DiMeo et al. ............. 348/668 |
| 6,130,721 A | * | 10/2000 | Yoo et al. ................... 348/558 |
| 6,137,904 A | * | 10/2000 | Lubin et al. ................ 382/162 |
| 6,253,022 B1 | * | 6/2001 | Strolle et al. .............. 386/109 |
| 6,275,606 B1 | * | 8/2001 | Myers ........................ 382/162 |
| 6,310,659 B1 | * | 10/2001 | Glen ........................... 348/589 |
| 6,327,002 B1 | * | 12/2001 | Rinaldi et al. ............. 348/554 |
| 6,392,714 B1 | * | 5/2002 | Steinberg et al. .......... 348/666 |
| 6,504,579 B1 | * | 1/2003 | Scherrer .................... 348/667 |
| 6,546,450 B1 | * | 4/2003 | Liu ............................ 710/316 |
| 6,674,488 B1 | * | 1/2004 | Satoh ......................... 348/663 |

* cited by examiner

Primary Examiner—Brian Yenke
(74) Attorney, Agent, or Firm—Blakely, Sokoloff, Taylor & Zafman LLP

(57) ABSTRACT

A method and an apparatus of decoding a television broadcasting signal are disclosed. In one embodiment, an improved video decoder converts the video signal into a digitized video signal. The improved video decoder then separates luminance information and chrominance information of the digitized video signal in a dimension that has a constancy value below a predetermined threshold level. Lastly, the improved video decoder optionally converts the separated luminance information and chrominance information into an output format that conforms to input requirements of the NTSC/PAL television.

14 Claims, 5 Drawing Sheets

THREE-DIMENSIONAL ENHANCEMENT PROCESSING FOR TELEVISION BROADCASTING SIGNALS

FIELD OF THE INVENTION

This invention relates to image processing technologies generally and particularly to video decoding systems.

BACKGROUND OF THE INVENTION

In order to conform to the National Television Standards Committee (hereinafter NTSC)/Phase Alternating Line (hereinafter PAL) standards for color television, a NTSC/PAL encoder interleaves the luminance and chrominance components in an intricate manner to conserve bandwidth and ensure compatibility with monochrome televisions. However, as the NTSC/PAL encoder processes higher resolution inputs because of the usage of higher resolution cameras, computer-based graphics animations, etc., proper decoding of such inputs is becoming increasingly difficult for a traditional NTSC/PAL decoder.

FIG. 1 illustrates prior art digital decoder 100 for a NTSC/PAL television receiver. Digital decoder 100 operates on composite video signals that conform to NTSC/PAL standards in three main stages. Specifically, after analog-to-digital (hereinafter A/D) converter 102 generates digitized composite signal 104 based on the incoming signals, Y/C separator 106 separates out luminance (Y) and chrominance (C) from this digitized composite signal 104. Because display subsystem 110 typically utilizes cathode-ray tube (hereinafter CRT) technology that uses red, green and blue phosphors to create the desired color, signal adjuster 108 operates further on the newly obtained Y and C signals to generate R (red), G (green) and B (blue) signals. Some of the functions that signal adjuster 108 performs are, but not limited to, chrominance demodulation, brightness, contrast, saturation and hue adjustment, display enhancement processing, color space conversion, pixel formatting, etc.

FIGS. 2(a) and 2(b) illustrate prior art Y/C separator 200 and prior art Y/C separator 220, respectively, for most of the existing NTSC televisions. In particular, Y/C separator 200 is an ordinary two-line comb filter that operates on digitized composite signal 104 as shown in FIG. 1. Y/C separator 200 employs first line delay element 202, second line delay element 204 and adder 206 to generate a double-amplitude output composite video signal 208 (since the sub-carriers for digitized composite video 104 are in phase). Because of a 180° phase difference between output composite video signal 208 and delayed composite video signal 212, subtracting the two signals cancels most of the luminance and leaves double-amplitude chrominance. Bandpass filter 216 further eliminates signals outside of a predefined frequency range for chrominance information to yield signal C. Adder/subtractor 218 then subtracts signal C from delayed composite video signal 212 to generate signal Y.

Y/C separator 200 however has trouble with diagonal lines and vertical color changes. With diagonal lines, Y/C separator 200's C signal as shown in FIG. 2(a) includes the difference between adjacent luminance values, which may be interpreted as chrominance information. Such interpretation results in cross-color artifacts. As for vertical color transitions, the so-called "dot crawl" artifact surfaces due to imperfect removal of color information from Y/C separator 200's Y signal as shown in FIG. 2(a).

Y/C separator 220 as illustrated in FIG. 2(b) is an improved solution over Y/C separator 200. Particularly, Y/C separator 220 includes vertical correlation detector 222, which determines the amount of line-to-line correlation. If line 1 (hereinafter L1) and line 2 (hereinafter L2) are highly correlated, vertical correlation detector 222 causes multiplexer (hereinafter Mux) 224 to select L2–L1 as its output. If L2 and line 3 (hereinafter L3) are highly correlated, the output of Mux 224 is then L2–L3. Although Y/C separator 220 may address the aforementioned cross-color and dot crawl artifacts, it may have problems with real-world video. More specifically, it may not have sufficiently correlated lines to adequately separate the luminance and chrominance signals as occurs with high resolution cameras and computer graphics animation. So, the more detail that is present in digitized composite video 104, the greater the artifacts would be introduced by Y/C separator 220.

As for many of the existing PAL televisions, they utilize Y/C separators that are similar to their NTSC counterparts as shown in FIGS. 2(a) and 2(b). One difference is that a PAL Y/C separator also has a PAL modifier that provides a 90° phase shift and removal of the PAL switch inversion. However, the PAL Y/C separator suffers from Hanover bars that result from a real and complementary hue error between pairs of adjacent lines and also cross-color as mentioned above.

As has been demonstrated, the decoding technologies that exist in many of the current NTSC/PAL televisions are unable to keep pace with the ever increasingly dynamic, complex and detailed video sources. Thus, an apparatus and method is needed to provide a cost-effective, flexible and highly scaleable video decoding solution that not only could accommodate the discussed shortcomings of the current NTSC/PAL television decoders, but also could further improve display quality of NTSC/PAL composite signal on other types of display equipment.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

An apparatus and method for decoding a television broadcasting signal are disclosed. In the following description, numerous specific details are set forth in order to provide a thorough understanding of the present invention. However, it will be apparent to one of ordinary skill in the art that the invention may be practiced without these particular details. In other instances, well known elements and theories such as sampling theorem, video processing architecture, video encoding techniques, color space conversion, etc. have not been described in special detail in order to avoid obscuring the present invention.

Both National Television Standards Committee (hereinafter NTSC)/Phase Alternating Line (hereinafter PAL) composite signals are well-known television broadcasting signals and are the sum of a luminance (or brightness) signal and a chrominance (or color) signal. Specifically, the luminance signal, or the Y signal, is derived from gamma-corrected red, green, and blue (or RGB) signals. On the other hand, the chrominance signal, or the C signal, is derived from the differences between the Y signal and the basic red, green, and blue signals. The C signal is further modulated onto a color sub-carrier, where the sub-carrier drives one modulator at sine phase and drives the other modulator at cosine phase. Under the NTSC standard, this color sub-carrier, or a secondary signal that contains additional information to a main signal, operates at approximately 3.58 MHz. Under the PAL standards (there are variations), this color sub-carrier operates at either approximately 3.58 MHz or 4.43 MHz.

Additionally, under the NTSC standard, one video frame consists of two interleaved fields. Each field contains half of the scan lines in the video frame and is displayed in its entirety. Therefore, the odd field is displayed, then the even, then the odd, and so on. Moreover, the scan lines from one field are interlaced with the scan lines in the next field. A "scan line" refers to an individual sweep across the face of the display by the electron beam that makes the video frame. A scan line also comprises a collection of pixels. Throughout this disclosure, "digital signal" and "digitized signal", are used interchangeably to broadly refer to binary representations of a continuous-time, or an analog, signal. The term, "S-video", is used for Super-Video, is a technology for transmitting video signals over a cable by dividing the video information into two signals, chrominance and luminance signal. Finally, a machine readable medium refers to, but not limited to, a storage device, a memory device, a carrier wave, etc.

Figure 1:
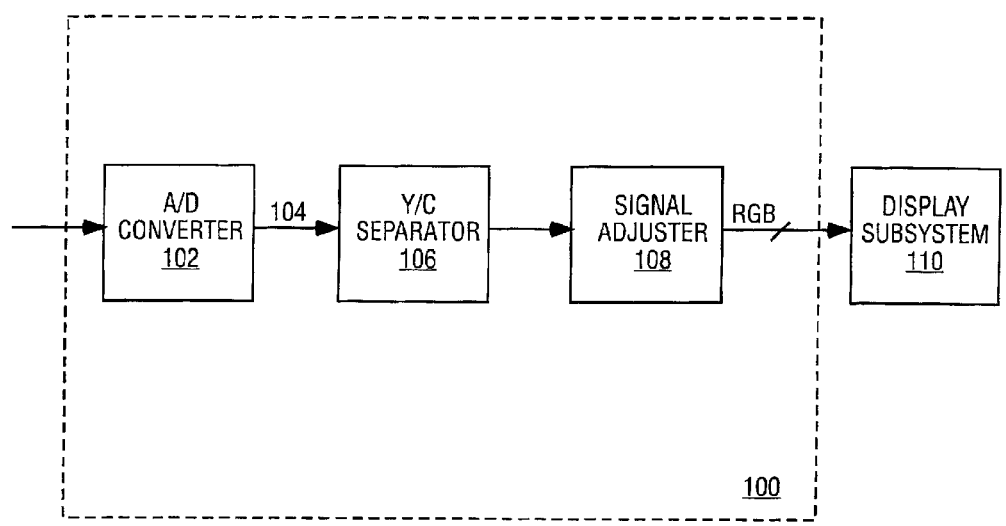
FIG. 1 illustrates a prior art digital decoder for a NTSC/PAL television receiver.
Figure 2A:
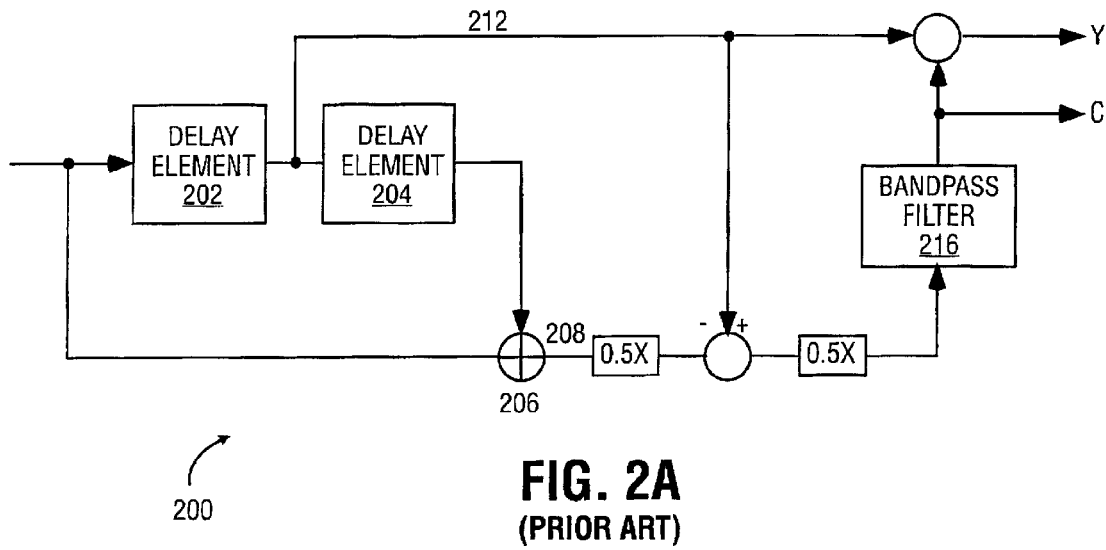
FIG. 2(a) illustrates one prior art implementation of a Y/C separator.
Figure 2B:
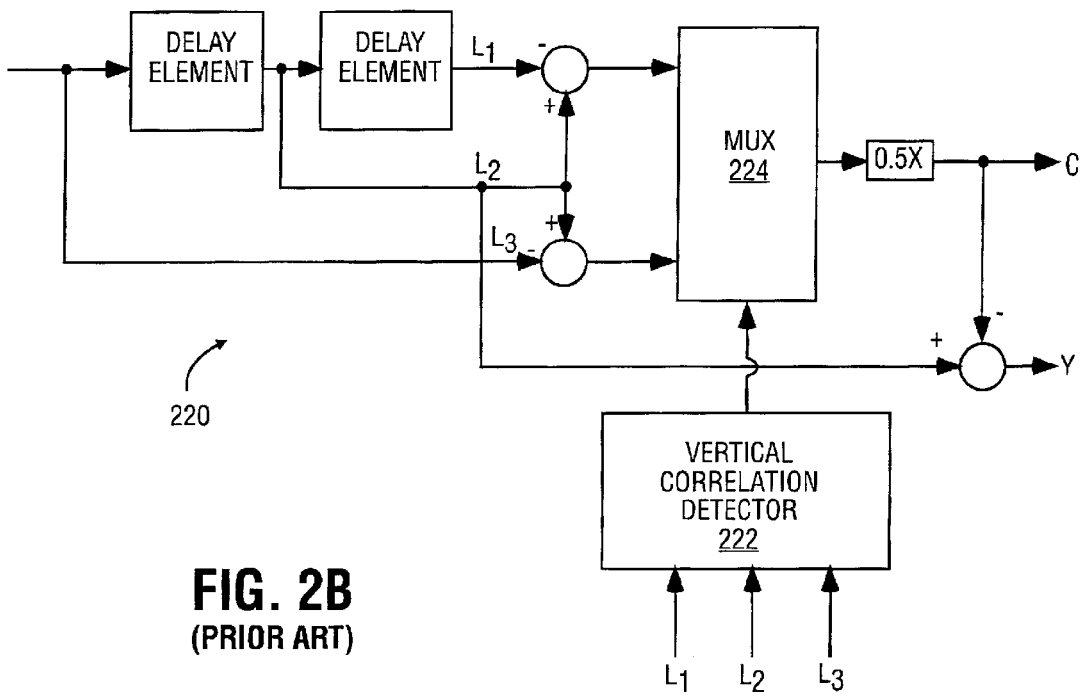
FIG. 2(b) illustrates another prior art implementation of a Y/C separator.
Figure 3:
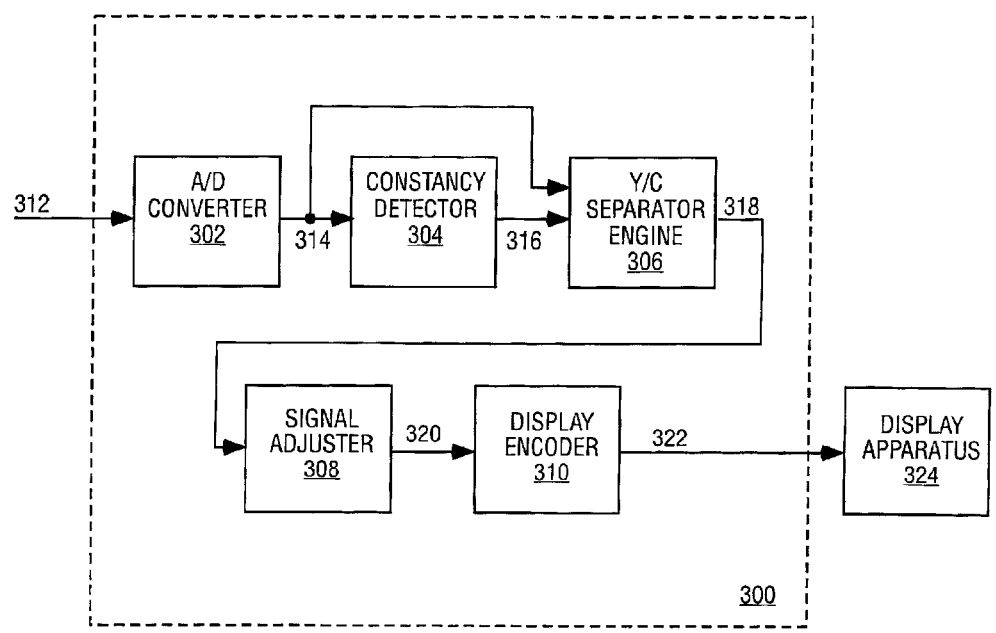
FIG. 3 illustrates one embodiment of a general block diagram of an improved video decoder.

FIG. 3 illustrates one embodiment of a general block diagram of the present invention, an improved video decoder (hereinafter IVD). For illustration purposes, the following discussions will mainly focus on the NTSC standard in describing IVD 300. However, it should be apparent to one with ordinary skill in the art to modify the described IVD 300 to operate with other television and video standards, such as the various PAL standards.

Figure 4:
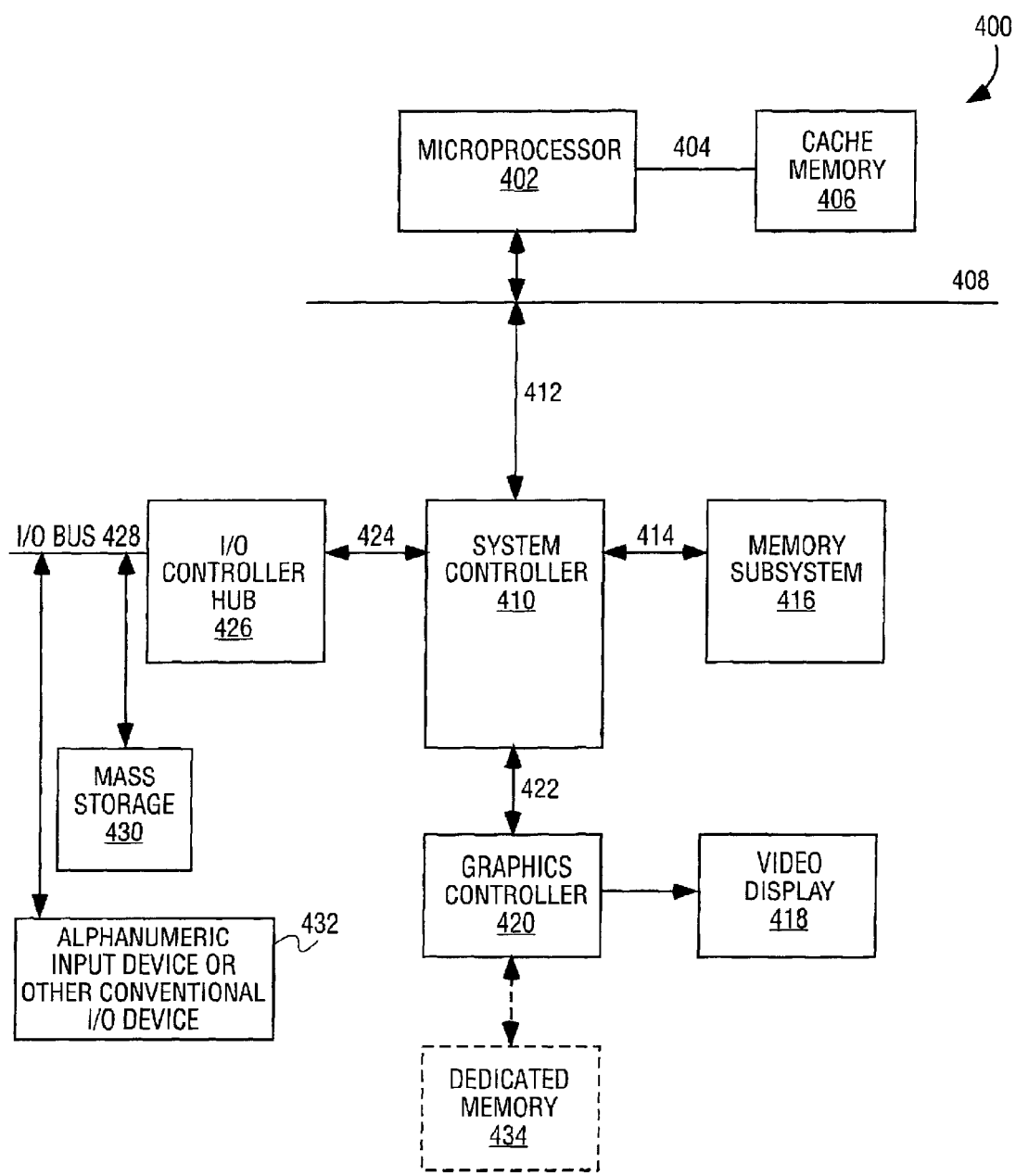
FIG. 4 illustrates a block diagram of one general-purpose computer system.

One embodiment of IVD 300 processes an analog NTSC/ PAL composite video signal 312 before the signal reaches display apparatus 324. Analog-to-digital converter (hereinafter A/D converter) 302 of IVD 300 samples this video signal 312 at some sampling frequency to generate digitized video signal 314, which consists of a sequence of discrete samples of the continuous-time NTSC/PAL composite video signal 312. One implementation of IVD 300 has A/D converter 302 sampling at four times of the color sub-carrier frequency, or 4*3.58 MHz=14.32 MHz, under the NTSC standard. Further discussions on this particular sampling frequency will be provided in the subsequent section that details the operations of IVD 300. Additionally, A/D converter 302 is often coupled to a memory device, such as memory subsystem 416 or dedicated memory 434 as shown in FIG. 4, to store samples of digitized video signal 314 for subsequent operations of IVD 300.

Based on digitized video signal 314, constancy detector 304 then proceeds to calculate a constancy value in a number of dimensions, namely, the horizontal, vertical and temporal dimensions. The constancy value in the horizontal dimension (hereinafter H constancy value) purports to quantify the amount of variation among the discrete samples of digitized video signal 314 on a same scan line. The constancy value in the vertical dimension (hereinafter V constancy value) focuses on the amount of variation among the discrete samples between different scan lines. Lastly, constancy in the temporal dimension (hereinafter T constancy value) mainly concentrates on the amount of variation among the discrete samples between frames that occur at different points in time. According to comparison results between the constancy values and some predefined threshold values, constancy detector 304 generates selection signal 316 for Y/C separation engine 306.

One embodiment of Y/C separation engine 306 contains three different filters: a horizontal filter, a 2-dimensional (hereinafter 2-D) filter and a 3-dimensional (hereinafter 3-D) filter. Based on selection signal 316, Y/C separation engine 306 selects an appropriate filter to process digitized video signal 314 and to generate filtered signal 318, or filtered Y and C signals. One implementation of a horizontal filter involves adding/subtracting discrete samples of digitized video signal 314 on a same scan line that are 180° out-of-phase. One embodiment of a 2-D filter involves adding/ subtracting discrete samples of digitized signal 314 that are on adjacent scan lines, whereas one implementation of a 3-D filter involves adding/subtracting discrete samples that are on different frames. Further discussions on additional implementation details of the interaction between selection signal 316 and Y/C separation engine 306 will be provided in the subsequent section that details the operations of IVD 300. It should be noted that an ordinary skilled artisan may include a different number or different types of filters that have been specifically described in Y/C separation engine 306 without exceeding the scope of the present invention.

Similar to the previously discussed signal adjuster 108 in the Background section, signal adjuster 308 operates further on filtered signal 318 to generate adjusted signal 320. However, unlike signal adjuster 108, signal adjuster 308 does not perform color space conversion in this embodiment. Instead, display encoder 310 encompasses that functionality. Thus, depending on the type of input format display apparatus 324 requires, such as S-video, composite video, etc., display encoder 310 ensures that encoded signal 322 is represented in the appropriate color space and also conforms to the required input format.

It should be noted that IVD 300 can be programmed or implemented in various types of electronic systems. Some examples of such an electronic system are, but not limited to, standalone electronic apparatuses, add-on circuit boards and general-purpose computer systems.

A general-purpose computer system 400 is illustrated in FIG. 4. The general-purpose computer system architecture comprises microprocessor 402 and cache memory 406 coupled to each other through processor bus 404. Sample computer system 400 also includes high performance system bus 408 and standard I/O bus 428. Coupled to high performance system bus 408 are microprocessor 402 and system controller 410. Additionally, system controller 410 is coupled to memory subsystem 416 through channel 414, is coupled to I/O controller hub 426 through link 424 and is coupled to graphics controller 420 through interface 422. Coupled to graphics controller is video display 418. Coupled to standard I/O bus 428 are I/O controller hub 426, mass storage 430 and alphanumeric input device or other conventional input/output device 432.

These elements perform their conventional functions well known in the art. Moreover, it should have been apparent to one ordinarily skilled in the art that computer system 400 could be designed with multiple microprocessors 402 and may have more components than that which is shown. Also, mass storage 420 may be used to provide permanent storage for the executable instructions of IVD 300 in one embodiment, whereas memory subsystem 416 may be used to temporarily store the executable instructions and samples of digitized video signal 314 during execution by microprocessor 402. Alternatively, samples of digitized video signal 314 may be stored in dedicated memory 434 (dotted block shown in FIG. 4), which is coupled to graphics controller 420.

Operation of One Embodiment of an Improved Video Decoder

Figure 5:
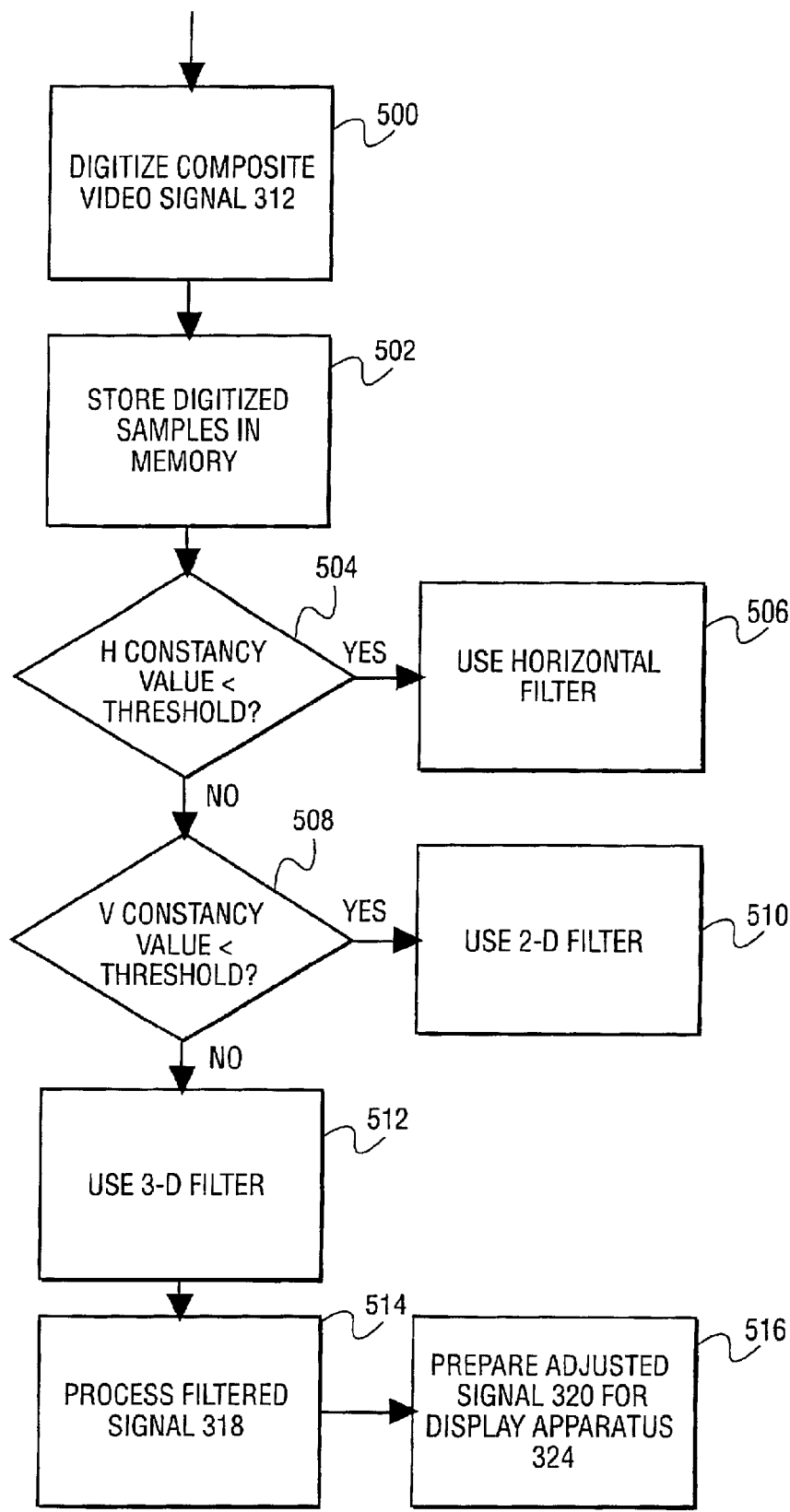
FIG. 5 illustrates a flow chart of one process that one embodiment of improved video decoder follows.

FIG. 5 illustrates a flow chart of one process that one embodiment of IVD 300 follows. In this embodiment, parts of IVD 300 are represented by a set of executable instructions that are stored in mass storage 420 of general-purpose computer system 400 as shown in FIG. 4. Additionally, display apparatus 324 as shown in FIG. 3 correlates to video display 418 in FIG. 4 and is also a NTSC television with S-video input in one embodiment.

In conjunction with FIG. 3 and FIG. 4, this embodiment of IVD 300 samples NTSC composite signal 312 at 4 times the color sub-carrier frequency in block 500. More specifically, this IVD 300's A/D converter 302 encompasses the functionality of one type of input/output device 432 of general-purpose computer system 400, which receives and converts the analog NTSC composite signal 312 into digitized signal 314. One embodiment of A/D converter 302 also includes some of the mentioned executable instructions of IVD 300. Particularly, in block 502, these executable instructions cause general-purpose computer system 400 to store an appropriate number of samples from digitized signal 314 in either memory subsystem 416 or dedicated memory 434 for further processing.

It is worth noting that NTSC composite signal 312 signal corresponds to a combination of a Y signal and a C signal, which is approximately modulated onto a 3.58 MHz color sub-carrier. Because of the modulation of the C signal, sampling NTSC composite signal 312 at (4*3.58) MHz results in the first sample of digitized signal 314 being 180° out-of-phase with the third sample but in-phase with the fifth sample. The mathematical relationships between some samples of digitized signal 314 are illustrated with the following equations:

$$C = U\sin(wt) + V\cos(wt), \text{ where } w = 2*pi*\text{sub-carrier frequency} \quad \text{Equation 1}$$

$$U^*\sin(wt+pi) = -U^*\sin(wt) \quad \text{Equation 2}$$

$$V^*\cos(wt+pi) = -V^*\cos(wt) \quad \text{Equation 3}$$

$$\text{Digitized video signal } 314 = Y + C \quad \text{Equation 4}$$

$$S_1 = Y_1 + C_1 \quad \text{Equation 5}$$

$$S_2 = Y_2 + C_2 \quad \text{Equation 6}$$

Equation 7 If $S_1$ and $S_2$ are 180° or pi out-of-phase, according to Equations 2 and 3, $$S_1 + S_2 = (Y_1 + U_1\sin(wt) + V_1\cos(wt)) +$$
$$(Y_2 + U_2\sin(wt + pi) + V_2\cos(wt + pi))$$
$$= (Y_1 + Y_2) + (U_1 - U_2)\sin(wt) + (V_1 - V_2)\cos(wt)$$

$$S_1 - S_2 = (Y_1 + U_1\sin(wt) + V_1\cos(wt)) -$$
$$(Y_2 + U_2\sin(wt) + V_2\cos(wt))$$
$$= (Y_1 - Y_2) + (U_1 - U_2)\sin(wt) + (V_1 - V_2)\cos(wt)$$

One embodiment of constancy detector 304 as shown in FIG. 3 utilizes the mathematical relationships presented above in calculating the H constancy value. More particularly, the equation is shown below:

$$H \text{ constancy value} = \text{abs } (S_1 - S_2), \quad \text{Equation 9}$$

where "abs" stands for "absolute value" and $S_1$ and $S_2$ are in-phase.

If samples on one scan line (or horizontal samples) do not vary much relative to one another, as equation 9 above indicates, the H constancy value of the samples would yield a low value. If the H constancy value is less than a predetermined threshold value in block 504, constancy detector 304 then informs Y/C separation engine 306 to proceed with a horizontal filter to distill the luminance and the chrominance information from digitized video signal 314 in block 506. In one implementation, constancy detector 304 assumes a low H constancy value for the samples that fall between the two in-phase samples if the in-phase samples have a low H constancy value.

As an illustration, assuming that the first sample $S_1$ and its in-phase counterpart, the fifth sample or $S_2$, do not vary at all, thus $Y_1 = Y_2$, $C_1 = C_2$ and the H constancy value=0. As has been mentioned above, constancy detector 304 assumes that the in-between sample, or third sample ($S_3$), remains constant relative to $S_1$. In other words, $Y_1 = Y_3$ and $C_1 = C_3$. Because the H constancy value is less than a non-zero threshold value in block 504, constancy detector 304 informs Y/C separation engine 306 to use a horizontal filter in block 506. Moreover, since $S_3$ is $S_1$'s out-of-phase counterpart, or 180° out-of-phase, the mathematical relationship in equation 7 governs the operations of the horizontal filter. Specifically, one embodiment of the horizontal filter sums $S_1$ and $S_3$ to cancel the chrominance information and to yield 2 *$Y_1$ (or 2*$Y_3$). Because digitized video signal 314=Y+C, this horizontal filter can retrieve the chrominance information by subtracting the luminance information, which results from the application of equation 7, from digitized video signal 314.

However, when horizontal samples change rather abruptly, or the H constancy value exceeds the predetermined threshold in block 504, one embodiment of constancy detector 304 proceeds to determine whether the V constancy value is below a predetermined threshold in block 508. More specifically, constancy detector 304 attempts to detect the amount of changes in a video frame in the vertical direction. Under the NTSC standard, it is important to note that the chrominance signal's phase is shifted by 180° after each scan line in one field. As an illustration, assuming the following:

$S_1$ represents the first sample of the first scan line
$S_2$ represents the first sample of the second scan line
$S_3$ represents the first sample of the third scan line $$S_1 = Y_1 + C_1 \quad \text{Equation 10}$$

$$S_2 = Y_2 - C_2 \quad \text{Equation 11}$$

$$S_3 = Y_3 + C_3 \quad \text{Equation 12}$$

One embodiment of constancy detector 304 calculates the V constancy value by taking the absolute value of the difference between two scan lines that have the same chrominance phase. Mathematically, $$V \text{ constancy value} = \text{abs}(S_1 - S_3) \qquad \text{Equation 15}$$

Similar to the calculation of the H constancy value, this implementation of constancy detector 304 assumes that $S_2$ remains constant if $S_1$ does not vary from $S_3$. In other words, if $Y_1 = Y_3$ and $C_1 = C_3$, then $Y_1 = Y_2$ and $C_1 = C_2$. In the event that V constancy value is below a predetermined threshold in block 508, constancy detector 304 informs Y/C separation engine 306 to choose a 2-D filter in block 510. One embodiment of the 2-D filter adds samples of successive scan lines, such as $S_1 + S_2$, to cancel the chrominance information and to obtain the luminance information.

Furthermore, if significant horizontal and vertical variations both exist in a field, then constancy detector 304 informs Y/C separation engine 306 to deploy a 3-D filter in block 512. Under the NTSC standard, it is important to note that the chrominance phase of one field is shifted by 180° in the same field of the successive frames. More specifically, $S_1$ represents the first sample in the first field of the first frame (first in time)

$S_2$ represents the first sample of the first field of the second frame (second in time)

$S_3$ represents the first sample of the first field of the third frame (third in time)

$$S_1 = Y_1 + C_1 \qquad \text{Equation 16}$$

$$S_2 = Y_2 - C_2 \qquad \text{Equation 17}$$

$$S_3 = Y_3 + C_3 \qquad \text{Equation 18}$$

Again, in order to cancel chrominance information and obtain luminance information, one embodiment of 3-D filter adds up $S_1$ and $S_2$.

Although specific details of one embodiment of constancy detector 304 and Y/C separation engine 306 have been described, it should be apparent to one with ordinary skill in the art to have significantly different designs or implementations and yet still remain within the scope of the present invention. For instance, even though portions of FIG. 5 illustrate one sequence that one embodiment of constancy detector 304 follows, constancy detector 304 is not limited to such sequence. For example, constancy detector 304 could start with calculating the T constancy value instead of the H constancy value. Alternatively, constancy detector 304 could compute all three constancy values in parallel.

After Y/C engine 306 separates the chrominance information and the luminance information, signal adjuster 308 as shown in FIG. 3 further processes filtered signal 318 in block 514. In block 516, display encoder 310 reformats adjusted signal 320 to match display apparatus 324's input requirements. This process of reformatting includes, but not limited to, color space conversion and pixel format conformance, etc. For instance, because display apparatus 324 is assumed to have S-video inputs, one embodiment of display encoder 310 relays adjusted signal 320 to display apparatus 324 without performing any color space conversion. Display encoder 310 nevertheless needs to make certain that the pixel data from IVD 300 are in recognizable formats (such as 24-bit RGB, 16-bit 4:2:2 YcbCr, etc.) to display apparatus 324. On the other hand, if display apparatus 324 requires RGB inputs, display encoder 310 first converts adjusted signal 320, which is in Y/C color space, into RGB color space and then encodes the converted signal into a RGB pixel format that meets the input requirements of display apparatus 324.

It is important to note that functionality of the disclosed blocks in FIG. 3 can either be combined or further divided without exceeding scope of the present invention. As an example, signal adjuster 308 and display encoder 310 can be combined into one general block. On the other hand, signal adjuster 308 can be further divided into blocks such as a demodulator block, display enhancement processing block, etc.

Thus, an apparatus and method for decoding a television broadcasting signal have been described. Although an improved video decoder has been described particularly with reference to the figures, it will be apparent to one of the ordinary skill in the art that the present invention may appear in any number of other electronic systems. It is contemplated that many changes and modifications may be made by one of ordinary skill in the art without departing from the spirit and scope of the present invention.

What is claimed is:

1. A method, comprising:

converting a television broadcasting signal into a digitized video signal, including
    sampling the television broadcasting signal at an integer multiple of a frequency of a chrominance sub-carrier to generate digitized samples, and
    storing a number of the digitized samples in a storage medium;

calculating a constancy value in a horizontal dimension (H constancy value), a vertical dimension (V constancy value) and a temporal dimension (T constancy value), calculating a constancy in the horizontal dimension including
    measuring an absolute value between two of the digitized samples on a same scan line that have same phases of the chrominance sub-carrier to establish the H constancy value;

separating luminance information and chrominance information of the digitized video signal in a dimension that has a constancy value below a predetermined threshold level, the constancy value representing an amount of variation among discrete samples of the digitized video signal within the dimension, separating luminance information and chrominance information including
    selecting a horizontal filter to perform the separation if the H constancy value is less than the predetermined threshold level, the separation including adding or subtracting discrete samples of the digitized video signal on the same scan line that are 180° out-of-phase; and optionally converting the separated luminance information and chrominance information into a first output format, wherein the first output format conforms to input requirements of a display apparatus.

2. The method according to claim 1, further comprising:
measuring an absolute value between a first digitized sample and a second digitized sample to establish the V constancy value, wherein the first digitized sample is in a particular position within a first scan line, the second digitized sample is in the same particular position within a second scan line, and the first scan line and the second scan line have same phases of the chrominance sub-carrier.

3. The method according to claim 1, further comprising:
measuring an absolute value between a first digitized sample and a second digitized sample to establish the T constancy value, wherein the first digitized sample is in a particular position within a first frame, the second digitized sample is in the same particular position within a second frame, and the first frame and the second frame have same phases of the chrominance sub-carrier.

4. A computer-readable medium including a plurality of instructions readable therefrom, the instructions, when executed by a computer system, cause the computer system to perform operations comprising:

converting a television broadcasting signal into a digitized video signal, including
sampling the television broadcasting signal at an integer multiple of a frequency of a chrominance sub-carrier to generate digitized samples, and
storing a number of the digitized samples in a storage medium;
calculating a constancy value in a horizontal dimension (H constancy value), a vertical dimension (V constancy value) and a temporal dimension (T constancy value), calculating a constancy in the horizontal dimension including
measuring an absolute value between two of the digitized samples on a same scan line that have same phases of the chrominance sub-carrier to establish the H constancy value;
separating luminance information and chrominance information of the digitized video signal in a dimension that has a constancy value below a predetermined threshold level, the constancy value representing an amount of variation among discrete samples of the digitized video signal within the dimension, separating luminance information and chrominance information including
selecting a horizontal filter to perform the separation if the H constancy value is less than the predetermined threshold level, the separation including adding or subtracting discrete samples of the digitized video signal on the same scan line that are 180° out-of-phase; and
optionally convening the separated luminance information and chrominance information into a first output format, wherein the first output format conforms to input requirements of a display apparatus.

5. The machine readable medium according to claim 4, the instructions further comprising:
measuring an absolute value between a first digitized sample and a second digitized sample to establish the V constancy value, wherein the first digitized sample is in a particular position within a first scan line, the second digitized sample is in the same particular position within a second scan line, and the first scan line and the second scan line have same phases of the chrominance sub-carrier.

6. The machine readable medium according to claim 4, the instructions further comprising:
measuring an absolute value between a first digitized sample and a second digitized sample to establish the T constancy value, wherein the first digitized sample is in a particular position within a first frame, the second digitized sample is in the same particular position within a second frame, and the first frame and the second frame have same phases of the chrominance sub-carrier.

7. The machine readable medium according to claim 4, the instructions further comprising:
selecting an appropriate filter to perform the separating based on the constancy value.

8. An apparatus, comprising:
a bus;
a processor coupled to the bus;
a system controller coupled to the bus;
a storage medium coupled to the system controller; and
an improved video decoder, further comprising:
an analog-to-digital converter, coupled to the bus, to convert a television broadcasting signal into a digitized video signal including sampling the television broadcasting signal at an integer multiple of a frequency of a chrominance sub-carrier to generate digitized samples and store digitized samples of the digitized video signal in the storage medium;
a constancy detector, coupled to the analog-to-digital convert, to determine a constancy value in a horizontal (hereinafter H constancy value), vertical (hereinafter V constancy value) and temporal (hereinafter T constancy value) dimension, the constancy value representing an amount of variation among discrete samples of the digitized video signal within the respective dimension, and calculating a constancy in the horizontal dimension including
measuring an absolute value between two of the digitized samples on a same scan line that have same phases of the chrominance sub-carrier to establish the H constancy value;
a luminance/chrominance separation engine, coupled to the constancy detector, to separate luminance information and chrominance information of the digitized video signal in a dimension that has a constancy value below a predetermined threshold level, the constancy value representing an amount of variation among discrete samples of the digitized video signal within the dimension, separating luminance information and chrominance information including
selecting a horizontal filter to perform the separation if the H constancy value is less than the predetermined threshold level, the separation including adding or subtracting discrete samples of the digitized video signal on the same scan line that are 180° out-of-phase; and
a display encoder, coupled to the luminance/chrominance separation engine, to optionally convert the separated luminance information and chrominance information into a first output format, wherein the first output format conforms to input requirements of a display apparatus.

9. The apparatus according to claim 8, the constancy detector further measures an absolute value between a first digitized sample and a second digitized sample to establish the V constancy value, wherein the first digitized sample is in a particular position within a first scan line, the second digitized sample is in the same particular position within a second scan line, and the first scan line and the second scan line have same phases of the chrominance sub-carrier.

10. The apparatus according to claim 8, the constancy detector further measures an absolute value between a first digitized sample and a second digitized sample to establish the T constancy value, wherein the first digitized sample is in a particular position within a first frame, the second digitized sample is in the same particular position within a second frame, and the first frame and the second frame have same phases of the chrominance sub-carrier.

11. A method, comprising:
converting a television broadcasting signal into a digitized video signal, including sampling the television broadcasting signal at an integer multiple of a frequency of a chrominance sub-carrier to generate digitized samples, and storing a number of the digitized samples in a storage medium;

calculating a constancy value in a horizontal dimension (H constancy value), a vertical dimension (V constancy value) and a temporal dimension (T constancy value), calculating a constancy value in a vertical dimension including measuring an absolute value between a first digitized sample and a second digitized sample to establish the V constancy value, wherein the first digitized sample is in a particular position within a first scan line, the second digitized sample is in the same particular position within a second scan line, and the first scan line and the second scan line have same phases of the chrominance sub-carrier;

separating luminance information and chrominance information of the digitized video signal in a dimension that has a constancy value below a predetermined threshold level, the constancy value representing an amount of variation among discrete samples of the digitized video signal within the dimension, separating luminance information and chrominance information including selecting a 2-D (two-dimensional) filter to perform the separation if the V constancy value is less than the predetermined threshold level, the separation including adding or subtracting discrete samples of the digitized video signal on the adjacent scan lines; and optionally converting the separated luminance information and chrominance information into a first output format, wherein the first output format conforms to input requirements of a display apparatus.

12. A method, comprising:

converting a television broadcasting signal into a digitized video signal, including sampling the television broadcasting signal at an integer multiple of a frequency of a chrominance sub-carrier to generate digitized samples, and storing a number of the digitized samples in a storage medium;

calculating a constancy value in a horizontal dimension (H constancy value), a vertical dimension (V constancy value) and a temporal dimension (T constancy value), calculating a constancy value in a vertical dimension including measuring an absolute value between a first digitized sample and a second digitized sample to establish the T constancy value, wherein the first digitized sample is in a particular position within a first frame, the second digitized sample is in the same particular position within a second frame, and the first frame and the second frame have same phases of the chrominance sub-carrier;

separating luminance information and chrominance information of the digitized video signal in a dimension that has a constancy value below a predetermined threshold level, the constancy value representing an amount of variation among discrete samples of the digitized video signal within the dimension, separating luminance information and chrominance information including selecting a 3-D (three-dimensional) filter to perform the separation if the T constancy value is less than the predetermined threshold level, the separation including adding or subtracting discrete samples of the digitized video signal on different frames; and optionally converting the separated luminance information and chrominance information into a first output format, wherein the first output format conforms to input requirements of a display apparatus.

13. A computer-readable medium including a plurality of instructions readable therefrom, the instructions, when executed by a computer system, cause the computer system to perform operations comprising:

converting a television broadcasting signal into a digitized video signal, including sampling the television broadcasting signal at an integer multiple of a frequency of a chrominance sub-carrier to generate digitized samples, and storing a number of the digitized samples in a storage medium;

calculating a constancy value in a horizontal dimension (H constancy value), a vertical dimension (V constancy value) and a temporal dimension (T constancy value), calculating a constancy value in a vertical dimension including measuring an absolute value between a first digitized sample and a second digitized sample to establish the V constancy value, wherein the first digitized sample is in a particular position within a first scan line, the second digitized sample is in the same particular position within a second scan line, and the first scan line and the second scan line have same phases of the chrominance sub-carrier;

separating luminance information and chrominance information of the digitized video signal in a dimension that has a constancy value below a predetermined threshold level, the constancy value representing an amount of variation among discrete samples of the digitized video signal within the dimension, separating luminance information and chrominance information including selecting a 2-D (two-dimensional) filter to perform the separation if the V constancy value is less than the predetermined threshold level, the separation including adding or subtracting discrete samples of the digitized video signal on the adjacent scan lines; and optionally converting the separated luminance information and chrominance information into a first output format, wherein the first output format conforms to input requirements of a display apparatus.

14. A computer-readable medium including a plurality of instructions readable therefrom, the instructions, when executed by a computer system, cause the computer system to perform operations comprising:

converting a television broadcasting signal into a digitized video signal, including sampling the television broadcasting signal at an integer multiple of a frequency of a chrominance sub-carrier to generate digitized samples, and storing a number of the digitized samples in a storage medium;

calculating a constancy value in a horizontal dimension (H constancy value), a vertical dimension (V constancy value) and a temporal dimension (T constancy value), calculating a constancy value in a temporal dimension including measuring an absolute value between a first digitized sample and a second digitized sample to establish the T constancy value, Wherein the first digitized sample is in a particular position within a first frame, the second digitized sample is in the same particular position within a second frame, and the first frame and the second frame have same phases of the chrominance sub-carrier;

separating luminance information and chrominance information of the digitized video signal in a dimension that has a constancy value below a predetermined threshold level, the constancy value representing an amount of variation among discrete samples of the digitized video signal within the dimension, separating luminance information and chrominance information including selecting a 3-D (three-dimensional) filter to perform the separation if the T constancy value is less than the predetermined threshold level, the separation including adding or subtracting discrete samples of the digitized video signal on different frames; and optionally converting the separated luminance information and chrominance information into a first output format, wherein the first output format conforms to input requirements of a display apparatus.

* * * * *

UNITED STATES PATENT AND TRADEMARK OFFICE
CERTIFICATE OF CORRECTION

PATENT NO. : 6,914,638 B2
DATED : July 5, 2005
INVENTOR(S) : Tsui

It is certified that error appears in the above-identified patent and that said Letters Patent is hereby corrected as shown below:

Column 11,
Line 46, delete "vertical" and insert -- temporal --.

Signed and Sealed this

Thirtieth Day of August, 2005

JON W. DUDAS
*Director of the United States Patent and Trademark Office*